United States Patent [19]

Irvin

[11] Patent Number: 4,503,730
[45] Date of Patent: Mar. 12, 1985

[54] LEVER CONTROL ASSEMBLY

[75] Inventor: John E. Irvin, Collegeville, Pa.

[73] Assignee: Teleflex Incorporated, Limerick, Pa.

[21] Appl. No.: 444,602

[22] Filed: Nov. 26, 1982

[51] Int. Cl.³ .......................... G05G 1/00; F16J 15/50
[52] U.S. Cl. ..................................... 74/566; 180/90.6;
    277/100; 74/18.1; 74/504
[58] Field of Search ................... 74/566, 18, 18.1, 504;
    180/90.6; 277/100

[56] References Cited

U.S. PATENT DOCUMENTS

| | | | |
|---|---|---|---|
| 2,610,410 | 9/1952 | L'Abée-Lund | 74/18.1 |
| 2,878,347 | 3/1959 | Schmidt | 74/566 |
| 2,989,874 | 6/1961 | Johnson | 74/566 |
| 3,082,642 | 3/1963 | Hammerand | 74/566 |
| 3,285,093 | 11/1966 | Sellmeyer | 74/566 |
| 3,378,286 | 4/1968 | Gottschald | 74/18 |
| 3,871,244 | 3/1975 | Gressard et al. | 74/491 |
| 4,029,324 | 6/1977 | Berkes | 74/566 |
| 4,191,064 | 3/1980 | Houk et al. | 74/475 |

Primary Examiner—Kenneth J. Dorner
Attorney, Agent, or Firm—Reising, Ethington, Barnard, Perry & Milton

[57] ABSTRACT

A lever control assembly including a housing adapted for attachment to a support structure, the housing including a slot having oppositely disposed tracks defining a length of the slot and an edge between each end of the tracks defining a width of the slot. An actuator extends through the slot and is movably supported by the housing for movement along the slot. A slot closure shield is mounted on the actuator and has an upper surface, the slot closure shield being biased against the tracks and edges of the slot to engage and conform to the tracks and edges for perfecting a slidable seal therewith to close the slot while moving with the actuator along the slot.

8 Claims, 6 Drawing Figures

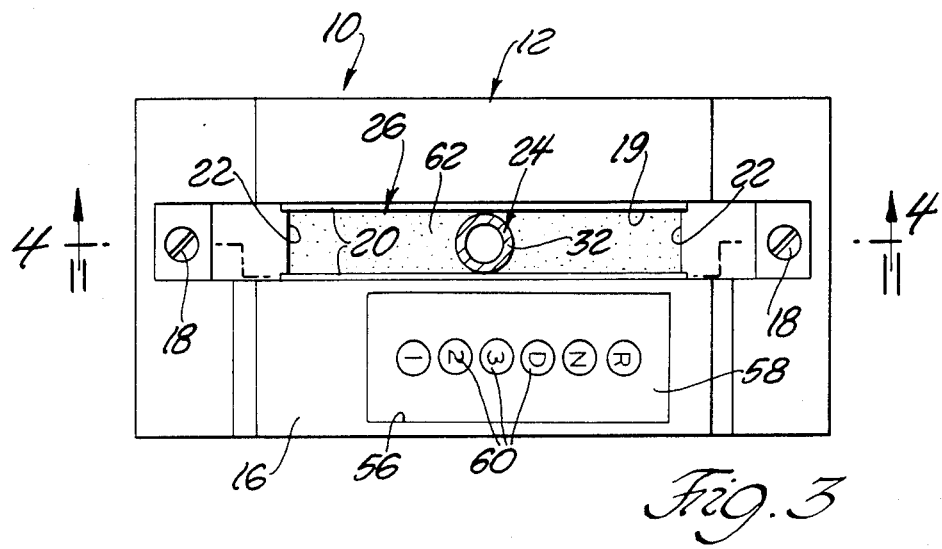
Fig. 3
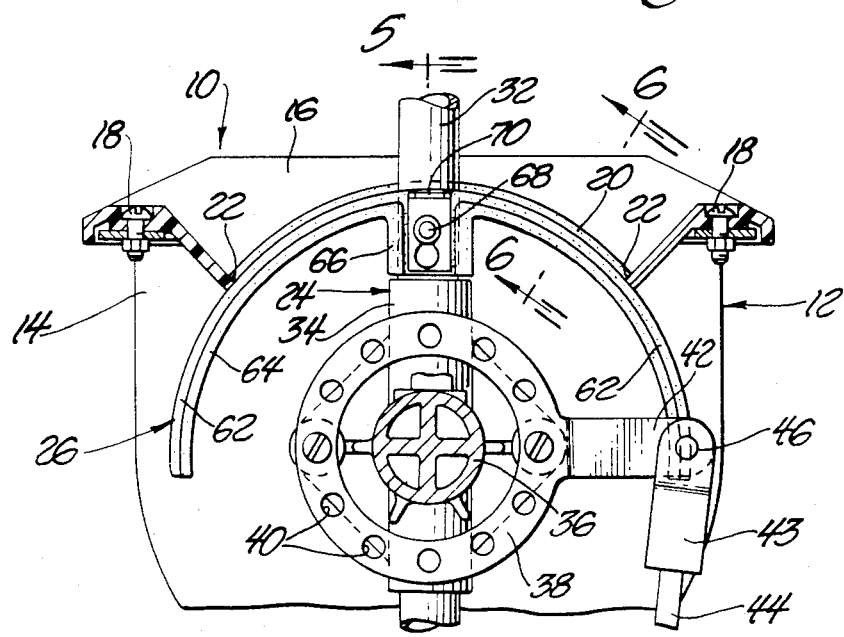
Fig. 4
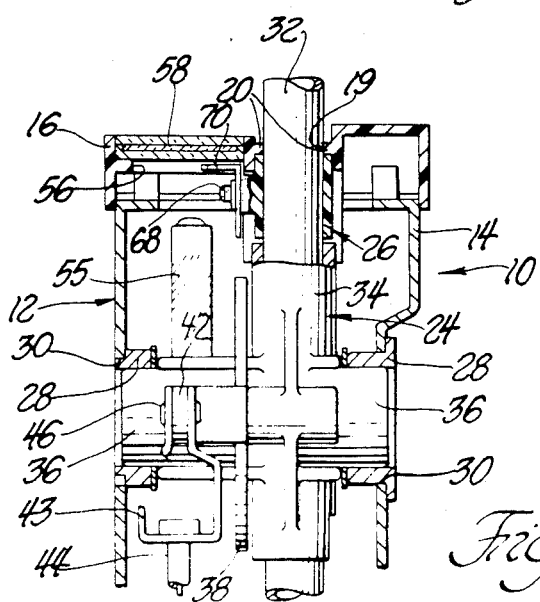
Fig. 5
Fig. 6

LEVER CONTROL ASSEMBLY

TECHNICAL FIELD

This invention relates to a lever control assembly of the type including an actuator movably supported by a housing for manual movement by an operating lever. A flexible motion transmitting core element is typically connected thereto, the core element being moved upon movement of the actuator to perform a controlling function in a remote location.

BACKGROUND ART

Lever control assemblies are commonly used to control throttle and transmission functions in various types of vehicles. Often such assemblies are used in marine craft for operating the various functions of an outboard or inboard engine. Generally, the assembly includes a housing for supporting the assembly on a support structure. An actuator, including a lever, is pivotally mounted on the housing and is operatively connected to a core element or rod for remotely controlling some engine function. Examples of such assemblies are taught by the U.S. Pat. No. 3,871,244 to Gressard et al, and U.S. Pat. No. 4,191,064 to Houk et al. The lever of the assembly often extends through a slot in the housing. It is desirable to prevent foreign particles from entering the housing through the slot. A slot cover may be mounted on the lever to be movable therewith to prevent foreign particles from entering the slot. The assembly disclosed by the Houk et al patent includes wipers at each end of the slot which contact a movable slot cover. A problem arises from foreign particles entering the housing along the length of the slot cover. The instant invention overcomes this problem by including means for perfecting a seal completely about the slot and slot cover.

STATEMENT OF THE INVENTION

According to the present invention, there is provided a lever control assembly including housing means adapted for attachment to a support structure, the housing means including a slot having oppositely disposed tracks defining a length of the slot and an edge between each end of the tracks defining a width of the slot. Actuator means extend through the slot, the actuator means being movably supported by the housing for movement along the slot. Slot closure means is mounted on the actuator means and has an upper surface and is biased against the tracks and edges of the slot to engage and conform to the tracks and edges for perfecting a slidable seal therewith to close the slot while the slot closure means moves with the actuator means along the slot.

FIGURES IN THE DRAWINGS

Other advantages of the present invention will be readily appreciated as the same becomes better understood by reference to the following detailed description when considered in connection with the accompanying drawings wherein:

FIG. 3 is a plan view taken substantially along line 3—3 of FIG. 1;

FIG. 4 is a fragmentary cross sectional view taken substantially along line 4—4 of FIG. 3;

FIG. 5 is a fragmentary cross sectional view taken substantially along line 5-5 of FIG. 5; and FIG. 6 is a fragmentary cross sectional view taken substantially along line 6—6 of FIG. 4.

DETAILED DESCRIPTION OF THE DRAWINGS

Figures 1, 2:
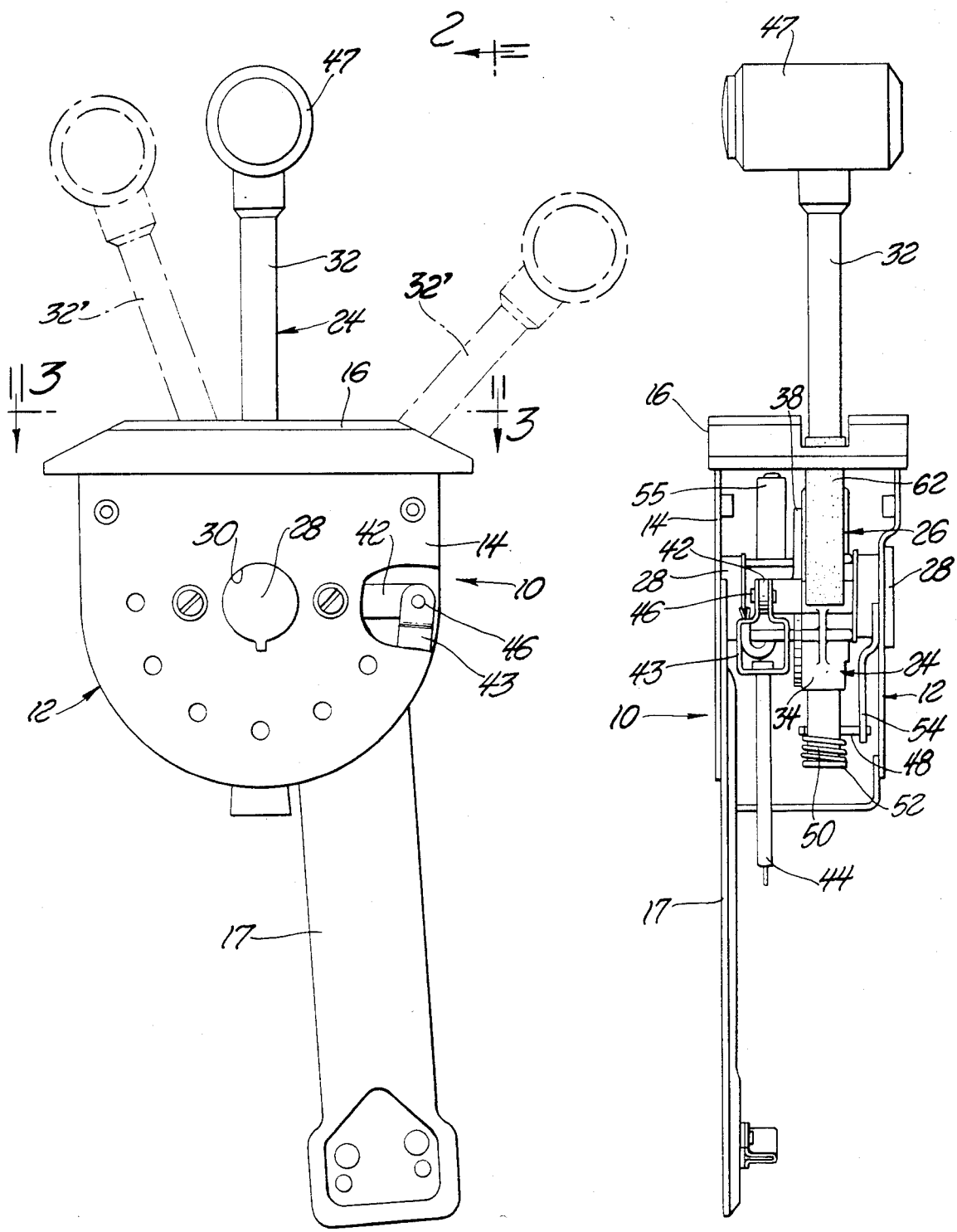
FIG. 1 is a side elevational view of a control lever assembly constructed in accordance with the instant invention.
FIG. 2 is a cross sectional view taken substantially along line 2—2 of FIG. 1.

A lever control assembly constructed in accordance with the instant invention is generally shown at 10.

The assembly 10 includes housing means generally indicated at 12 adapted for attachment to a support structure. The housing means 12 includes a U-shaped base member 14 and a lid or cover member 16. A support arm 17 extends downwardly from the base member 14. The cover member 16 is fastened to the base member 14 by suitable fastening means such as screws 18. The cover member 16 includes a first slot 19 having oppositely disposed tracks 20 extending along the length of the slot 19, and an edge 22 between each end of the tracks 20. Each edge 22 defines a width of the slot 19, the tracks 20 defining the length of the slot 19. The assembly 10 further includes actuator means, generally indicated at 24, extending through the slot 19 and being movably supported by the base member 14 of the housing means 12 for movement along the slot 19. The assembly 10 also includes a slot closure means generally indicated at 26 mounted on the actuator means 24. The slot closure means 26 is biased against the tracks 20 and edges 22 of the cover member 16 to engage and conform to the tracks 20 and edges 22 for perfecting a slidable seal therewith to close the slot 19 while the slot closure means 26 moves with the actuator means 24 along the slot 19. That is, the slot closure means 26 is flexible and biased against the tracks 20 and edges 22 of the slot 19 to conform to the shape of the tracks 20 and engage the edges 22 so as to form a seal therewith. The seal is maintained as the slot closure means 26 slides against the tracks 20 and edges 22.

More specifically, the assembly 10 includes mounting means comprising bearing members 28 supported in openings 30 in the base member 14. The actuator means 24 includes a tubular lever 3 which is cast into a cross member 34 having integral stub shafts 36 extending therefrom. The shafts 36 are disposed in the molded bearings 28 and define a pivot axis about which the actuator means 24 pivots. A circular index plate 38 is attached to the actuator means 24 and includes a plurality of spaced holes 40 disposed about the periphery thereof. An integral attachment arm 42 extends from the index plate 38. A bracket 43 is pivotally secured to the arm 42 at 46, a control member 44 being attached to the bracket 43. The control member 44 may be a rod or a cable leading to an accelerator or throttle control mechanism. A control knob 47 is connected to the distal end of the lever 32. A rod member (not shown) is disposed within the hollow lever 32 and operatively connected to a pin member 48. The pin member 48 is biased upwardly by a spring member 50 disposed between the pin member 48 and a flange 52, the flange 52 extending radially outwardly from the lever 32. A detente plate 54 is mounted on the base member 14. The pin 48 engages and disengages the detente plate 54 by actuation of a button in the control knob 47 which actuates the rod within the lever 32 to lower the pin member 48 against the bias of the spring 50 so as to engage and disengage the pin member 48 from various locking notches disposed about the periphery of the detente plate 54.

A lamp 55 is operatively connected to the cross member 38. The lamp 55 rotates with the cross member 38 and the lever 32 is pivoted. The cover member 16 includes a second slot 56. A transparent lens 58 is disposed over the slot 56, the lens 58 having various information 60 printed thereon. As the lamp 55 rotates with the actuator means 24, the lamp 55 illuminates through the various information 60 coincidental with the notch position of the detente plate 54. Thus, the lamp 55 indicates the information on the lens 58 corresponding to the condition of the assembly controlled by the control member 44.

The tracks 20 of the cover member 16 are semicircular and define a first arc circumscribed about the pivot axis defined by the bearings 28. The slot closure means comprises a unitary molded shield member 26 slidably disposed on the lever 32. The shield 26 includes a substantially arcuate portion 62 having a reinforcing flange 64 extending along the length thereof. The shield 26 further includes reinforcing means comprising an integral substantially cylindrical portion 66 centrally disposed between the ends of the arcuate portion 62 extending radially inwardly therefrom. An integral pin 68 extends outwardly from the cylindrical portion 66 for supporting a flag member 70. The flag member 70 moves with the lever 32 and light 55 so as to function as an indicator below the lens 58.

The arcuate portion 62 defines a second arc which is flatter than the first arc defined by the tracks 20 of the slot 19 when the actuator means 24 is disposed below the pivot axis defined by the bearings 28. In other words, when the assembly 10 is not assembled, the flexible arcuate portion of the shield member 26 defines a second arc which is flatter than the arc defined by the tracks 20. When the cover member 16 is mounted on the base member 14, the pivot axis defined by the bearings 28 is located relative to the tracks 20 so that the flexible arcuate portion 62 of the shield 26 is forced against the tracks 20 and edges 22 of the slot 19 to conform to the first arc defined by the tracks 20 as the actuator means 24 is mounted for pivoting movement about the pivot axis. In other words, when the shield member 26 is disposed on the lever 32 and the stub shafts 36 of the cross member 38 are disposed within the bearings 28, the shield member 26 is forced against the tracks 20 and edges 22 of the slot 19 so as to conform therewith. Thus, a slidable seal is perfected between the shield 26 and tracks 20 and edges 22 of the cover member 16. Accordingly, the shield 26 effectively prevents the ingress of foreign matter into the housing 12 during the operation of the assembly 10.

The upper surface of the cross member 34 provides an abutment means for supporting the shield 26 on the lever 32. More specifically, when the shield 26 is disposed on the lever 32, the substantially cylindrical portion 66 becomes seated on the cross member 34. Upon mounting of the actuator means 24 in the bearings 28, the cross member 34 abuts against the substantially cylindrical portion 66 of the shield member 26 so as to bias the shield member 26 against the tracks 20 and edges 22 of the slot 19 so that the shield member 26 conforms thereto.

Thus, the assembly 10 constructed in accordance with the instant invention provides a slot closure means having a seal perfected completely thereabout. In use, when the stub shafts 36 are mounted in the bearings 28 for pivoting movement relative to the pivot axis defined by the bearings 28, the cross member 34 biases the shield 26 against the tracks 20 and edges 22 of the slot 19. The shield 26 is forced to conform to the shape of the tracks 20 so as to engage the tracks 20 and edges 22 of the slot 19, thereby perfecting a seal therebetween. Upon pivoting movement of the lever 32 about the pivot axis defined by the bearings 28, the shield 26 moves with the lever 32 so as to slide against the tracks 20 and edges 22 of the slot 19, thereby maintaining the seal therebetween. Thus, the instant invention provides a slot closure means having a seal perfected completely about the slot closure means and the slot during actuation of the assembly.

The invention has been described in an illustrative manner, and it is to be understood that the terminology which has been used is intended to be in the nature of words of description rather than limitation. Many modifications and variations of the present invention are possible in light of the above disclosure. It is, therefore, to be understood that, within the scope of the appended claims, the invention may be practiced otherwise than as specifically described.

The embodiments of the invention in which an exclusive property or privilege is claimed are defined as follows:

1. A lever control assembly comprising: housing means adapted for attachment to a support structure and including a slot having oppositely disposed tracks defining a length of said slot and an edge between each end of said tracks defining a width of said slot; actuator means extending through said slot and being movably supported by said housing means for movement along said slot; slot closure means mounted on said actuator means; and mounting means for pivotally mounting said actuator means on said housing and including a pivot axis, said tracks being semicircular and defining a first arc circumscribed about said pivot axis, said slot closure means including a flexible arcuate portion including a upper surface, said flexible arcuate portion being internally stressed along its entire length radially urging it toward a second arc flatter than said first arc to perfect a slidable seal with said upper surface engaging with and conforming to said tracks and edges to close said slot while moving with said actuator means along said slot.

2. An assembly as defined in claim 1 wherein said actuator means includes a rod and abutment means for supporting said slot closure means on said rod, said slot closure means including a flexible arcuate member defining said flexible arcuate portion having a central opening therethrough and reinforcing means disposed about said opening, said rod extending through said opening and said reinforcing means being seated on said abutment means so that said arcuate member is biased against said tracks and said edges by said abutment means when said actuator means is disposed in said mounting means.

3. An assembly as defined in claim 2 wherein said reinforcing means includes an integral and substantially cylindrical flange extending about said opening and radially inwardly from said flexible arcuate member.

4. An assembly as defined in claim 2 wherein said slot closure means includes a reinforcing flange extending along the length of said flexible arcuate portion.

5. An assembly as defined in claim 2 wherein said mounting means includes a pair of oppositely disposed arm supports disposed on said pivot axis, said actuator means including a pair of oppositely disposed arms extending radially outwardly from said lever, said arms being seated in said arm supports for allowing pivoting movement of said lever about said pivot axis.

6. An assembly as defined in claim 5 wherein said actuator means includes a cross member including said arms, said rod being casted within said cross member.

7. An assembly as defined in claim 5 wherein said housing means includes a base member having said arm supports and a cover member including said slot, said cover member being fastened to said base member.

8. An assembly as defined in claim 7 wherein said base member includes oppositely disposed openings therethrough, said arm supports including cylindrical mold bearings mounted in each of said openings.

* * * * *